(12) United States Patent
Seger, II et al.

(10) Patent No.: US 10,282,554 B2
(45) Date of Patent: *May 7, 2019

(54) SYSTEM AND METHOD FOR PROVIDING A CRYPTOGRAPHIC PLATFORM FOR EXCHANGING INFORMATION

(71) Applicant: MANIFOLD TECHNOLOGY, INC., Menlo Park, CA (US)

(72) Inventors: Robert A. Seger, II, San Jose, CA (US); Christopher T. Finan, Menlo Park, CA (US)

(73) Assignee: MANIFOLD TECHNOLOGY, INC., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/183,708

(22) Filed: Jun. 15, 2016

(65) Prior Publication Data

US 2016/0306982 A1    Oct. 20, 2016

Related U.S. Application Data

(63) Continuation of application No. 14/686,601, filed on Apr. 14, 2015, now Pat. No. 9,397,985.

(51) Int. Cl.
*H04L 29/06* (2006.01)
*G06F 21/60* (2013.01)
(Continued)

(52) U.S. Cl.
CPC .............. *G06F 21/602* (2013.01); *H04L 9/14* (2013.01); *H04L 9/30* (2013.01); *H04L 63/0442* (2013.01); *H04L 2209/38* (2013.01)

(58) Field of Classification Search
CPC ....... G06F 21/602; G06F 21/64; H04L 63/04; H04L 63/0442; H04L 2209/38
See application file for complete search history.

(56) References Cited

U.S. PATENT DOCUMENTS 4,601,012 A    7/1986  Aiken
5,552,897 A *  9/1996  Mandelbaum ........ H04M 3/387
                                              340/5.74
(Continued)

FOREIGN PATENT DOCUMENTS

CA    2874277    10/2015

OTHER PUBLICATIONS

Paar et al., Understanding Cryptography, Springer; 1st ed., Oct. 19, 2011.*
(Continued)

*Primary Examiner* — Khang Do
(74) *Attorney, Agent, or Firm* — DLA Piper LLP US (57) ABSTRACT

A system and method configured for providing a cryptographic platform for exchanging information. One or more information transactions including encrypted information may be generated and/or provided to a distributed ledger. The one or more information transactions may include information intended for one or more parties. Information transactions intended for one or more parties may be identified. An information transaction may include one or more of a transaction identifier associated with one or more parties, an information payload, and/or other information. The information payload may include encrypted information. The encrypted information may be encrypted with one or more public keys associated with one or more parties. One or more information transactions may be retrieved from the distributed ledger. The encrypted information may be decrypted with one or more private keys that correspond to the public keys. Presentation of the encrypted information to one or more parties may be facilitated.

24 Claims, 3 Drawing Sheets

(51) Int. Cl.
*H04L 9/30* (2006.01)
*H04L 9/14* (2006.01)

(56) References Cited

U.S. PATENT DOCUMENTS

| | | | |
|---|---|---|---|
| 6,199,049 B1 | 3/2001 | Conde et al. | |
| 6,760,752 B1 | 7/2004 | Liu et al. | |
| 8,316,237 B1 | 11/2012 | Felsher et al. | |
| 8,458,462 B1 | 6/2013 | Hanna | |
| 8,694,789 B2 | 4/2014 | Chapman | |
| 9,118,632 B1* | 8/2015 | Chuang | H04L 63/0428 |
| 2006/0212465 A1 | 9/2006 | Fish et al. | |
| 2007/0245311 A1 | 10/2007 | Bumgarner et al. | |
| 2008/0172469 A1* | 7/2008 | Verona | H04L 51/34 |
| | | | 709/206 |
| 2009/0307490 A1 | 12/2009 | Dancer et al. | |
| 2010/0037067 A1 | 2/2010 | Rangadass et al. | |
| 2010/0268952 A1* | 10/2010 | Chung | H04L 9/3236 |
| | | | 713/170 |
| 2011/0141974 A1 | 6/2011 | Lieberman | |
| 2011/0154044 A1* | 6/2011 | Spalka | H04L 63/0442 |
| | | | 713/176 |
| 2012/0054095 A1 | 3/2012 | Lesandro et al. | |
| 2012/0102080 A1 | 4/2012 | Kirihara et al. | |
| 2012/0109812 A1* | 5/2012 | Hinkle | G06Q 20/40 |
| | | | 705/37 |
| 2012/0233470 A1 | 9/2012 | Everett | |
| 2013/0031182 A1 | 1/2013 | Gross et al. | |
| 2013/0036105 A1 | 2/2013 | Lucas | |
| 2013/0159631 A1 | 6/2013 | Seufert et al. | |
| 2014/0149357 A1 | 5/2014 | Gupta | |
| 2014/0164254 A1 | 6/2014 | Dimmick | |
| 2014/0181041 A1 | 6/2014 | Whitehead | |
| 2014/0337447 A1 | 11/2014 | Payne et al. | |
| 2014/0351415 A1 | 11/2014 | Harrigan et al. | |
| 2014/0372377 A1 | 12/2014 | Kruglick | |
| 2015/0026072 A1 | 1/2015 | Zhou et al. | |
| 2015/0058291 A1 | 2/2015 | Earl et al. | |
| 2015/0206106 A1 | 7/2015 | Yago | |
| 2015/0228004 A1 | 8/2015 | Bednarek et al. | |
| 2015/0256461 A1 | 9/2015 | Mosko et al. | |
| 2015/0332283 A1 | 11/2015 | Witchey | |
| 2015/0379510 A1 | 12/2015 | Smith | |
| 2016/0012424 A1 | 1/2016 | Simon et al. | |
| 2016/0027229 A1 | 1/2016 | Spanos et al. | |
| 2016/0028552 A1 | 1/2016 | Spanos et al. | |
| 2016/0086175 A1 | 3/2016 | Finlow-Bates et al. | |
| 2016/0150060 A1 | 5/2016 | Meng et al. | |
| 2016/0212093 A1* | 7/2016 | Meixler | H04L 51/066 |
| 2016/0224949 A1 | 8/2016 | Thomas et al. | |
| 2016/0253622 A1 | 9/2016 | Sriram et al. | |
| 2016/0260095 A1* | 9/2016 | Ford | G06Q 20/401 |
| 2016/0260169 A1 | 9/2016 | Arnold et al. | |

OTHER PUBLICATIONS

Okupski, (Ab)using Bitcoin for anti-censorship tool, 2014, https://pure.tue.nl/ws/portalfiles/portal/47007279/785844-1.pdf (Year: 2014).*

Jonathan Warren, Bitmessage: A Peer-to-Peer Message Authentication and Delivery System, Nov. 27, 2012, https://bitmessage.org/bitmessage.pdf (Year: 2012).*

International Search Report issued in PCT/US2016/051727 dated Nov. 29, 2016.

Written Opinion issued in PCT/US2016/051727 dated Nov. 29, 2016.

Chondros et al. "A distributed Integrity Catalog for Digital Repositories," University of Athens, Sep. 25, 2014, pp. 1-14, retrieved on Nov. 4, 2016 from https://pdfs.semanticscholar.org/a021/5c4544057973ee9eeb07bdd1f88031561dd1.pdf.

International Search Report issued in PCT/US2016/022512 dated Nov. 7, 2016.

Written Opinion issued in PCT/US2016/022512 dated Nov. 7, 2016.

U.S. Appl. No. 14/686,601.

International Search Report issued in PCT/US2017/019976 dated May 16, 2017.

Written Opinion issued in PCT/US2017/019976 dated May 16, 2017.

International Search Report issued in PCT/US2017/016178 dated Apr. 21, 2017.

Written Opinion issued in PCT/US2017/016178 dated Apr. 21, 2017.

Kume et al. "New Cryptocurrency Protocol Without Proof of Work", The Institute of Electronics; Publication [online], Jan. 19, 2016, retrieved Sep. 25, 2017 from http://www.ai.soc.i.kyoto-u-ac.jp/renke/security/public_html/paper/scis2106_kume.pdf>, pp. 1-7.

U.S. Appl. No. 15/422,669,

U.S. Appl. No. 15/266,651.

U.S. Appl. No. 15/419,055.

* cited by examiner

SYSTEM AND METHOD FOR PROVIDING A CRYPTOGRAPHIC PLATFORM FOR EXCHANGING INFORMATION

CROSS REFERENCE TO RELATED APPLICATIONS

This application is a continuation of U.S. application Ser. No. 14/686,601 filed Apr. 14, 2015 and entitled, "SYSTEM AND METHOD FOR PROVIDING A CRYPTOGRAPHIC PLATFORM FOR EXCHANGING INFORMATION," which is incorporated herein by reference in its entirety.

FIELD OF THE DISCLOSURE

This disclosure relates to systems and methods for providing a cryptographic platform for exchanging information.

BACKGROUND

Typically, secure methods of communication between two parties via traditional avenues are generally private. Encryption is one example of a way to protect communications and/or data such that only authorized parties may read or the communication and/or data. Encrypted messages are usually transmitted from one party to another via email, short messaging service (SMS), or other direct (i.e., source to destination) electronic message. The transmission of an encrypted communication is generally private and not recorded in a log that can be audited after the fact by a third party.

SUMMARY

One aspect of the disclosure relates to a system configured for providing a cryptographic platform for exchanging information. Exemplary implementations may retrieve and/or provide one or more information transactions to a distributed ledger. The information transactions may include encrypted information intended for a given party. The encrypted information may be encrypted with the intended party's public key such that a private key associated with the intended party is required to decrypt the encrypted information. The encrypted information may be decrypted with an associated private key such that it may be displayed to the intended recipient. Information transactions including a second information encrypted by the intended recipient's public key may be generated and provided to the distributed ledger. As such, in exemplary implementations, the cryptographic platform facilitates secure private communication between multiple parties via information transactions provided and retrieved from a distributed ledger. Furthermore, the cryptographic platform enables confidential, verifiable, and immutable recording and/or reporting of information transactions including various encrypted information (e.g., private communications) that may be audited by a third party.

In some implementations, providing a cryptographic platform for exchanging information may be performed by processors executing computer program components. In some implementations, the system may include one or more servers. The server(s) may be configured to communicate with one or more client computing platforms according to a client/server architecture. The parties may access the system via client computing platform(s).

In some implementations, the system(s) and/or method(s) for providing a cryptographic platform for exchanging information as described herein may be used as a means of exchange from one to many and/or many to one (e.g., from one party to multiple parties and/or from multiple parties to one party). In some implementations, the parties may include one or more of multiple end parties, multiple sub-parties of a single party (e.g., to facilitate exchange of information internally and/or among subordinate entities), and/or other parties.

The server(s) may be configured to execute machine-readable instructions. The machine-readable instructions may include one or more of a key component, an identification component, a retrieval component, a decryption component, a presentation component, an information component, an encryption component, a transaction component, a ledger component, and/or other components.

In some implementations, the key component may be configured to provide a first public key associated with a first party to a second party. The first public key may be provided to the second party to enable information intended for the first party to be encrypted with the first public key. In some implementations, the key component may be configured to obtain a second public key associated with a second party.

The identification component may be configured to identify a first information transaction. The first information transaction may include information intended for the first party. One or more information transactions, including the first information transaction, may be held within a distributed ledger. The distributed ledger may provide a verifiable record of one or more information transactions. The first information transaction may include one or more of: a first information transaction identifier associated with the first party; a first information payload; and/or other information. The first information payload may include first encrypted information. The first encrypted information may be encrypted with a first public key associated with the first party. In some implementations, the first information transaction identifier may not be encrypted. In some implementations, the first information transaction identifier may include the first public key.

In some implementations, the identification component may be configured to identify a second party as a source of the first information transaction. In some implementations, the identification component may be configured to identify one or more information transactions included in an audit.

The retrieval component may be configured to retrieve the first information transaction from the distributed ledger. The distributed ledger may provide a verifiable record of various information transactions including various information payloads that include various encrypted information that is encrypted with various public keys. In some implementations, the retrieval component may be configured to retrieve one or more of information describing the one or more information transactions determined to be included in the audit, information payloads included in the one or more information transactions determined to be included in the audit, the one or more information transactions determined to be included in the audit, and/or other information related to an audit.

The decryption component may be configured to decrypt the first encrypted information with a first private key that corresponds to the first public key. The presentation component may be configured to facilitate presentation of the first encrypted information through an electronic display to the first party.

In some implementations, the information component may receive second information from the first party. The second information may include a communication for the second party (e.g., a response to the first encrypted information).

In some implementations, the encryption component may be configured to encrypt the second information with a second public key associated with the second party. In some implementations, the encryption component may be configured to encrypt the second information with a third public key associated with a third party. As such, a second private key and a third private key may be required to decrypt the encrypted second information.

In some implementations, the first encrypted information may include a request for information. The encrypted second information may include information requested in the request for information. The first encrypted information and/or the encrypted second information may include one or more of a message, an image, a document, a video, and/or other types of content. For example, the encrypted first information and/or the encrypted second information may include one or more of know your customer (KYC) data; anti-money laundering (AML) data; and/or other financial data.

The system(s) and method(s) for providing a cryptographic platform for exchanging information as described herein may be used for various applications and the disclosure and examples provided are not intended to be limiting. In some implementations, for example, the various applications may include: exchange of financial information; managing rewards points; storing and exchanging transaction-specific payment tokens; facilitating remittance services; reconciling accounts across disparate entities (e.g., subsidiaries and/or partners); consolidating discrete business unit ledgers; replacing legacy core settlement systems; transferring health care information; and/or other applications.

In some implementations, the transaction component may be configured to generate a second information transaction. The second information transaction may include one or more of: a second information transaction identifier associated with the second party; a second information payload; and/or other information. The second information payload may include encrypted second information. In some implementations, the encrypted second information included in the second payload may include a first portion and a second portion. The first portion may be encrypted with the second public key associated with the second party. The second portion may be encrypted with a third public key associated with a third party. In some implementations, the second portion may be encrypted with the third public key.

In some implementations, the ledger component may be configured to provide the second information transaction, including the second information payload, to the distributed ledger. In some implementations, the ledger component is configured to interface with a public distributed ledger platform (e.g., a Ripple® ledger). In some implementations, the ledger component may be configured to manage a private distributed ledger according to a custom consensus protocol. Managing the distributed ledger may include implementing the custom consensus protocol to create verified instances of the distributed ledger.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
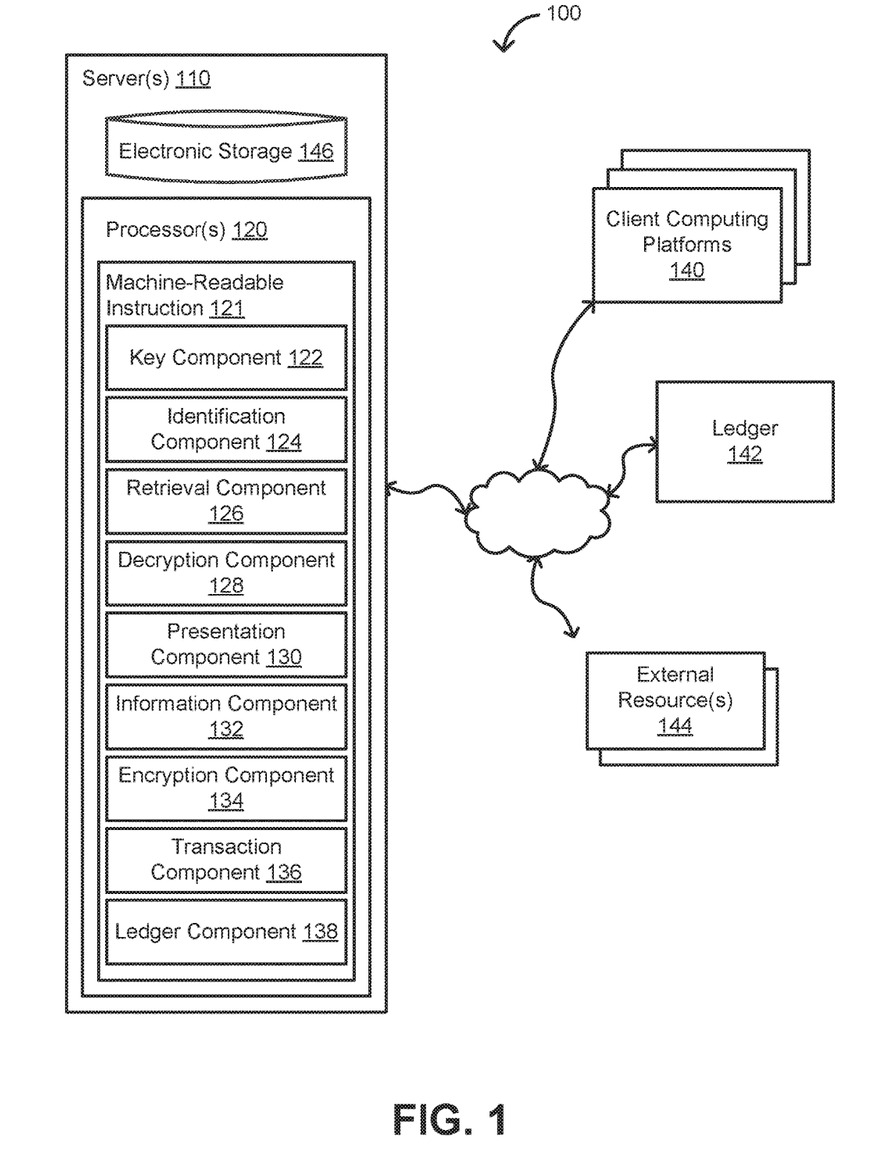
FIG. 1 illustrates a system for providing a cryptographic platform for exchanging information, in accordance with one or more implementations.

FIG. 1 illustrates a system 100 configured for providing a cryptographic platform for exchanging information, in accordance with one or more implementations. System 100 may be configured to identify a first information transaction. The first information transaction may include information intended for a first party. One or more information transactions, including the first information transaction, may be held within a distributed ledger. The first information transaction may include one or more of a first information transaction identifier associated with the first party, a first information payload, and/or other information. The first information payload may include first encrypted information. The first encrypted information may be encrypted with a first public key associated with the first party. System 100 may be configured to retrieve the first information transaction from the distributed ledger. As such, in exemplary implementations, the distributed ledger may provide a verifiable record of various information transactions, including various information payloads that include various encrypted information that is encrypted with various public keys. System 100 may decrypt the first encrypted information with a first private key that corresponds to the first public key. Presentation of the first encrypted information to the first party may be facilitated by system 100 through an electronic display.

System 100 may include one or more servers 110. Server(s) 110 may be configured to communicate with client computing platform(s) 140 according to a client/server architecture. A user and/or one or more given parties may access system 100 via client computing platform(s) 140. In some implementations, ledger 142 may include a distributed ledger managed by an external system. Server(s) 110 may be configured to communicate with ledger 142 according to a peer-to-peer architecture, client/server architecture, server/server architecture, and/or other architectures. Communicating with ledger 142 may include communicating with one or more additional server(s) (e.g., participants of the distributed ledger).

The server(s) 110 may be configured to execute machine-readable instructions 121. Machine-readable instructions 121 may include one or more of a key component 122, an identification component 124, a retrieval component 126, a decryption component 128, a presentation component 130, an information component 132, an encryption component 134, a transaction component 136, a ledger component 138, and/or other components.

System 100 may implement one or more forms of public key, or asymmetric, cryptography to facilitate communication through the distributed ledger. Key component 122 may be configured to provide one or more public keys associated with a given party to one or more parties having a desire to communicate with the given party. In some implementations, key component 122 may be configured to store public keys associated with one or more parties. Associated with a given party may include unique to and/or belonging to the given party. For example, a public key associated with the given party may correspond to a private key held by the given party. In some implementations, key component 122 may be configured to obtain one or more public keys associated with one or more parties. A given public key associated with a given party may be obtained for encrypting information intended for (e.g., to be received by) the given party.

In some implementations, key component 122 may be configured to store one or more private keys corresponding to various public keys associated with one or more parties. Key component 122 may be configured to obtain a given private key associated with a given party in order to decrypt information encrypted with a given corresponding public key that was intended for (e.g., received by) the given party. In some implementations, key component 122 may be configured to securely store, obtain, and/or provide one or both of public keys or private keys associated with one or more parties such that information included in a given payload that is included in a given information transaction may be encrypted and/or decrypted. Additional security measures may be enabled by system 100 and/or key component 122 to ensure that access to the private keys and/or to the information decrypted by the private keys is limited to system 100 and the parties associated with the private keys. In some implementations, one or more private keys may be held and/or generated by one or third parties. Thus, in some implementations, the private keys may be provided to system 100 (e.g., key component 122) by the one or more parties for individual decryption instances.

By way of non-limiting example, key component 122 may provide a first public key associated with a first party to a second party such that information intended for the first party may be encrypted with the first public key. By way of further non-limiting example, key component 122 may obtain a second public key associated with the second party such that information (e.g., a response) intended for the second party may be encrypted with the second public key.

Identification component 124 may be configured to identify one or more information transactions that may be held within a distributed ledger. The information transactions may include information intended for one or more given parties. The distributed ledger may provide a verifiable record of one or more information transactions. In some implementations, the distributed ledger may include one or more of a public ledger, a blockchain, a consensus ledger, a distributed database, and/or another verified record log. In some implementations, the distributed ledger may include a public distributed ledger. By way of non-limiting example, the public distributed ledger may include a Ripple® ledger. In some implementations, the distributed ledger may include a private distributed ledger provided and/or managed by system 100.

Identifying one or more transactions that may be held within the distributed ledger may include one or more of: communicating with one or more third-party servers configured to monitor the distributed ledger and/or to identify one or more information transactions; monitoring the distributed ledger; polling the distributed ledger; reviewing a list of information transactions in the distributed ledger (e.g., produced by some third party); receiving an indication, such as a separate electronic message or other indication, from a party who has entered an information transaction to the distributed ledger; pulling one or more information transactions; flagging one or more information transactions; filtering one or more information transactions; requiring that the intended party participate in the initial generation of the information transaction/recording of the information (e.g., requiring that the intended party cryptographically sign the message for it be entered into the ledger), reviewing transactions in an otherwise agreed upon window(s) of time (e.g., parties negotiate that their messages will be spaced, via some mathematical distribution, every X milliseconds into the ledger), and/or other methods of identifying one or more transactions. In some implementations, the transactions may be identified based on the transaction identifier.

Identification component 124 may be configured to identify a first information transaction that may be held within the distributed ledger. The first information transaction may include information intended for the first party. By way of non-limiting example, the information intended for the first party may include one or more of a message, an image, a document, a video, and/or other types of content. Continuing the non-limiting example, the information may include and/or be associated with one or more of know your customer (KYC) data; anti-money laundering (AML) data; and/or other financial data.

The first information transaction may include one or more of: a first information transaction identifier associated with the first party; a first information payload; and/or other information. The first information payload may include first encrypted information. The first encrypted information may be encrypted with a first public key associated with the first party. The first encrypted information may include one or more types of content, such as a message, an image, a document, a video, and/or other types of content. In some implementations, the first encrypted information may include and/or be associated with one or more of know your customer (KYC) data; anti-money laundering (AML) data; and/or other financial data.

In some implementations, the first encrypted information may include a request for information. In some implementations, the first encrypted information may include information provided in response to a communication and/or request received via one or more other avenues (e.g., besides the distributed ledger). For example, one or more other avenues may include email, website communications, short messaging service (SMS), and/or other communication methods.

In some implementations, the first information transaction identifier included in the first information transaction may not be encrypted. As such, for example, identification component 124 may not be required to read through the entire contents of the first information transaction to identify that it is intended for the first party. By way of non-limiting example, the first information transaction identifier may include the first public key. In some implementations, a transaction identifier may include one or more of a public key, a subject and/or topic associated with the information transaction, a keyword, a user/party identification, a conversation or thread identifier (e.g., to provide a common marking for a conversation back and forth between two or more parties), a specific and/or weighted cost of an information transaction (e.g., transactions between two parties may cost 0.0001 cents and thus be identifiable by such a charge), and/or other identifiers enabling the identification of information transactions intended for a given party.

In some implementations, information and/or content that must be contained within a given transaction identifier may be provided to a user via one or more information transactions and/or alternative communication avenues. For example, Party A may email Party B to inform Party B to use #123456789 as a transaction identifier on an information transaction (e.g., communication) intended for Party A so that the identification component may recognize the information transaction as being intended for Party A. By way of another example, Party A may use #987654321 as a transaction identifier in a first information transaction intended for Party B and include a request and/or requirement that Party B use #987654321 as the transaction identifier in a second information transaction (e.g., a response to the first information transaction).

In some implementations, identification component 124 may identify a source of a given information transaction to enable the intended recipient to provide a response to the given information transaction. The source of a given transaction may be identified based on one or more of a given transaction identifier, information included in the given information transaction, and/or other information. Identification component 124 may be configured to identify a second party as a source of the first information transaction. Thus, for example, the first party may respond to the second party via system 100.

In some implementations, system 100 may be configured to enable one or more auditors to audit the information transactions held within the distributed ledger. Identification component 124 may be configured to identify one or more information transactions included in an audit. For example, an auditor may request to audit all information transactions provided and/or retrieved by system 100 for a given party. Thus, continuing the example, identification component 124 may be configured to identify all information transactions intended for the given party and all information transactions where the given party is a source.

In some implementations, identification component 124 may be configured to identify one or more information transactions containing information that should be reported to an outside party. By way of non-limiting example, one or more information transactions including know your customer (KYC) data and/or anti-money laundering (AML) data, may be identified.

Retrieval component 126 may be configured to retrieve one or more information transactions identified as intended for a given party from the distributed ledger. Retrieval component 126 may retrieve the first information transaction from the distributed ledger. Retrieving the first information transaction from the distributed ledger may include one or more of enabling a user to access the first information transaction held within the distributed ledger, recording and/or providing a location of the first information transaction with the distributed ledger, copying the first information transaction for storage, receiving the first information transaction from a third party server configured to parse through the distributed ledger, obtaining the first information transaction from the distributed ledger, and/or other methods of retrieving the first information transaction from the distributed ledger.

In some implementations, retrieval component 126 may be configured to retrieve information associated with information transactions identified by identification component 124 as being included in an audit. Retrieval component 126 may be configured to retrieve one or more of information describing the one or more information transactions determined to be included in the audit, information payloads included in the one or more information transactions determined to be included in the audit, the one or more information transactions determined to be included in the audit, and/or other information related to an audit.

In some implementations, retrieval component 126 may be configured to retrieve one or more information transactions identified as transactions containing information that should be reported to an outside party. By way of non-limiting example, one or more information transactions including know your customer (KYC) data and/or anti-money laundering (AML) data, may be retrieved.

Decryption component 128 may be configured to decrypt encrypted information included in one or more information transactions. The encrypted information may be decrypted with one or more private keys corresponding to the public keys with which the information was decrypted. Decryption component 128 may be configured to decrypt the first encrypted information with a first private key that corresponds to the first public key. In some implementations, decryption component 128 may be configured to communicate with key component 122 in order to obtain one or more private keys for decrypting the information included in one or more information transactions.

In some implementations, decryption component 128 may be configured to decrypt encrypted information included in the information payloads of the information transactions identified as transactions containing information that should be reported to an outside party. By way of non-limiting example, the encrypted information included in the information payloads of the information transactions identified, including know your customer (KYC) data and/or anti-money laundering (AML) data, may be retrieved. Continuing the non-limiting example, once retrieved, the know your customer (KYC) data and/or anti-money laundering (AML) data may be packaged for an outside party (e.g., the Financial Crimes Enforcement Network (FinCEN)).

Presentation component 130 may be configured to facilitate presentation of encrypted information to one or more users through an electronic display. In some implementations, the encrypted information presented to one or more users includes the decrypted encrypted information. Presentation component 130 may be configured to effectuate presentation of the first encrypted information through an electronic display to the first party. For example, the first encrypted information presented to the first party may be presented as decrypted first encrypted information.

In some implementations, information component 132 may receive second information from one or more parties. The second information may include a response to information presented to the given party that is included in a given payload of a given information transaction intended for (e.g., received by) the given party. Information component 132 may be configured to receive second information from the first party. The second information may include a communication for the second party (e.g., a response to the first encrypted information).

In some implementations, encryption component 134 may be configured to encrypt the second information received from one or more parties. The second information may be encrypted with one or more public keys to create encrypted second information. In some implementations, encryption component 134 may be configured to communicate with key component 122 to obtain one or more public keys associated with one or more given parties. The one or more public keys obtained may be used to encrypt second information and/or other information intended for the given parties.

Encryption component 134 may be configured to encrypt the second information with a second public key associated with the second party. In some implementations, the second public key may be obtained by key component 122. As such, the encryption component 134 may communicate with key component 122 to obtain the second public key. Encrypting the second information with the second public key may enable the second party, or a user associated with the second party possessing the corresponding second private key, to read the encrypted second information.

In some implementations, second information may include information requested in a request for information. In some implementations, the encrypted second information may include one or more types of content, such as, a message, an image, a document, a video, and/or other types of content. In some implementations, responsive to the first encrypted information including a request for information, the encrypted second information may include the information requested in the request for information. By way of non-limiting example, the encrypted second information may include and/or be associated with one or both of know your customer (KYC) data, anti-money laundering (AML) data, and/or other financial data.

In some implementations, encryption component 134 may be configured to further encrypt information included in one or more information payloads of one or more information transactions with multiple public keys. Thus, in some implementations, multiple private keys may be required to decrypt information included in one or more information payloads of one or more information transactions. By way of non-limiting example, information may be encrypted with multiple public keys associated with multiple parties when information is intended to be viewed by the multiple parties in collaboration.

In some implementations, encryption component 134 may be configured to encrypt the second information with a third public key associated with a third party. As such, a second private key and a third private key may be required to decrypt the encrypted second information. In some implementations, the encrypted second information may include a first portion and a second portion. The first portion may be encrypted with the second public key associated with the second party. The second portion may be encrypted with a third public key associated with a third party. As such, the second party may be able to decrypt the first portion of the encrypted second information using the corresponding second private key. The third party may able to decrypt the second portion of the encrypted second information using a corresponding third private key.

In some implementations, transaction component 136 may be configured to generate one or more information transactions. Transaction component 136 may generate a second information transaction. The second information transaction may include one or more of: a second information transaction identifier associated with the second party; a second information payload; and/or other information. The second information payload may include encrypted second information. In some implementations, the second information transaction may be generated by and/or on behalf of the first party to respond to the first information transaction. In some implementations, the encrypted second information included in the second payload may include the first portion and the second portion as described herein.

In some implementations, ledger component 138 may be configured to provide one or more information transactions including encrypted information to the distributed ledger. Ledger component 138 may be configured to provide the second information transaction, including the second information payload, to the distributed ledger (e.g., 142). In some implementations, ledger component 138 may be configured to interface with a public distributed ledger (e.g., ledger 142). By way of non-limiting example, the public distributed ledger may include a Ripple® ledger. In some implementations, ledger component 138 may be configured to provide and/or manage a private distributed ledger.

In some implementations, system 100 may provide one or more information transactions to and/or retrieve one or more information transactions to the distributed ledger. A determination of whether one or more information transactions, including one or more of the information exchanges provided by system 100, should be included in the distributed ledger may be made. The determination of whether to include the one or more information exchanges in the distributed ledger may be made based on a consensus protocol. The consensus protocol may define a process by which network participants (e.g., nodes/servers) may agree on changes and/or additions to the distributed ledger. By way of non-limiting example, the consensus protocol may include a public consensus protocol. A public consensus protocol may include, for example, one or more of the Ripple® Protocol, the "mining" proof of work protocol implemented by Bitcoin, and/or other public consensus protocols. By way of another non-limiting example, the consensus protocol may include a private and/or custom consensus protocol. In some implementations, ledger component 138 may be configured to manage a private distributed ledger according to the custom consensus protocol. In some implementations, responsive to the network participants reaching an agreement (i.e., consensus) on one or more changes and/or additions (e.g., to include one or more information transactions) to the distributed ledger, a new instance of the distributed ledger may be created and distributed to all network participants. The process may be repeated and each time a consensus is reached a new instance of the distributed ledger may be created. The new instance of the distributed ledger may include added information exchanges provided by system 100. The new instance of the distributed ledger may be immutable. Thus, the distributed ledger may provide a verifiable record of all of the information exchanges including various information transactions including encrypted information. In some implementations, a record of all instances of the distributed ledger (e.g., a ledger chain, a blockchain) may be generated to provide a verifiable record of all instances of the distributed ledger. As such, in some implementations, both a latest new instance of the distributed ledger and/or the record of all instances of the distributed ledger provide a verifiable record of the various information transactions retrieved and/or provided by system 100.

In some implementations, server(s) 110, client computing platform(s) 140, ledger 142, and/or external resource(s) 144 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 110, client computing platform(s) 140, ledger 142, and/or external resource(s) 144 may be operatively linked via some other communication media.

A given client computing platform 140 may include one or more processors configured to execute machine-readable instructions. The machine-readable instructions may be configured to enable an expert or user associated with the given client computing platform 140 to interface with system 100, ledger 142, external resource(s) 144, and/or provide other functionality attributed herein to client computing platform(s) 140. By way of non-limiting example, the given client computing platform 140 may include one or more of a desktop computer, a laptop computer, a handheld computer, a tablet computing platform, a netbook, a smartphone, a gaming console, and/or other computing platforms.

Ledger 142 may include a system, computing platform(s), server(s), electronic storage, external resource(s), processor(s), and/or other components associated with a distributed ledger. System 100, client computing platform(s) 140, external resource(s) 144, and/or other components may be configured to communicate with ledger 142. In some implementations, ledger 142 may include one or more server(s) participating in connection with server(s) 110 to provide a distributed ledger.

External resource(s) 144 may include sources of information, hosts and/or providers of transaction platforms outside of system 100, external entities participating with system 100, and/or other resources. In some implementations, some or all of the functionality attributed herein to external resource(s) 144 may be provided by resources included in system 100.

Server(s) 110 may include electronic storage 146, one or more processor(s) 120, and/or other components. Illustration of server(s) 110 in FIG. 1 is not intended to be limiting. Server(s) 110 may include a plurality of hardware, software, and/or firmware components operating together to provide the functionality attributed herein to server(s) 110. For example, server 110 may be implemented by a cloud of computing platforms operating together as server 110.

Electronic storage 146 may comprise non-transitory storage media that electronically stores information. The electronic storage media of electronic storage 146 may include one or both of system storage that is provided integrally (i.e., substantially non-removable) with a respective component of system 100 and/or removable storage that is removably connectable to a respective component of system 100 via, for example, a port (e.g., a USB port, a firewire port, etc.) or a drive (e.g., a disk drive, etc.). Electronic storage 146 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 146 may include one or more virtual storage resources (e.g., cloud storage, a virtual private network, and/or other virtual storage resources). Electronic storage 146 may store software algorithms, information determined by a processor, and/or other information that enables components of system 100 to function as described herein.

Processor(s) 120 may be configured to provide information processing capabilities in server(s) 110. As such, processor(s) 120 may include one or more of a digital processor, an analog processor, a digital circuit designed to process information, an analog circuit designed to process information, a state machine, and/or other mechanisms for electronically processing information. Although processor(s) 120 is shown in FIG. 1 as a single entity, this is for illustrative purposes only. In some implementations, processor(s) 120 may include a plurality of processing units. The processor(s) 120 may be configured to execute machine-readable instructions 121. Machine-readable instructions 121 may include components 122, 124, 126, 128, 130, 132, 134, 136, 138, and/or other components. The processor(s) 120 may be configured to execute components 122, 124, 126, 128, 130, 132, 134, 136, 138, and/or other components by software; hardware; firmware; some combination of software, hardware, and/or firmware; and/or other mechanisms for configuring processing capabilities on processor(s) 120.

The description of the functionality provided by the different components 122, 124, 126, 128, 130, 132, 134, 136, and/or 138 described herein is for illustrative purposes, and is not intended to be limiting, as any of components 122, 124, 126, 128, 130, 132, 134, 136, and/or 138 may provide more or less functionality than is described. For example, one or more of components 122, 124, 126, 128, 130, 132, 134, 136, and/or 138 may be eliminated, and some or all of its functionality may be provided by other ones of components 122, 124, 126, 128, 130, 132, 134, 136, and/or 138. As another example, processor(s) 120 may be configured to execute one or more additional computer readable instruction components that may perform some or all of the functionality attributed below to one of components 122, 124, 126, 128, 130, 132, 134, 136, and/or 138.

Figure 2:
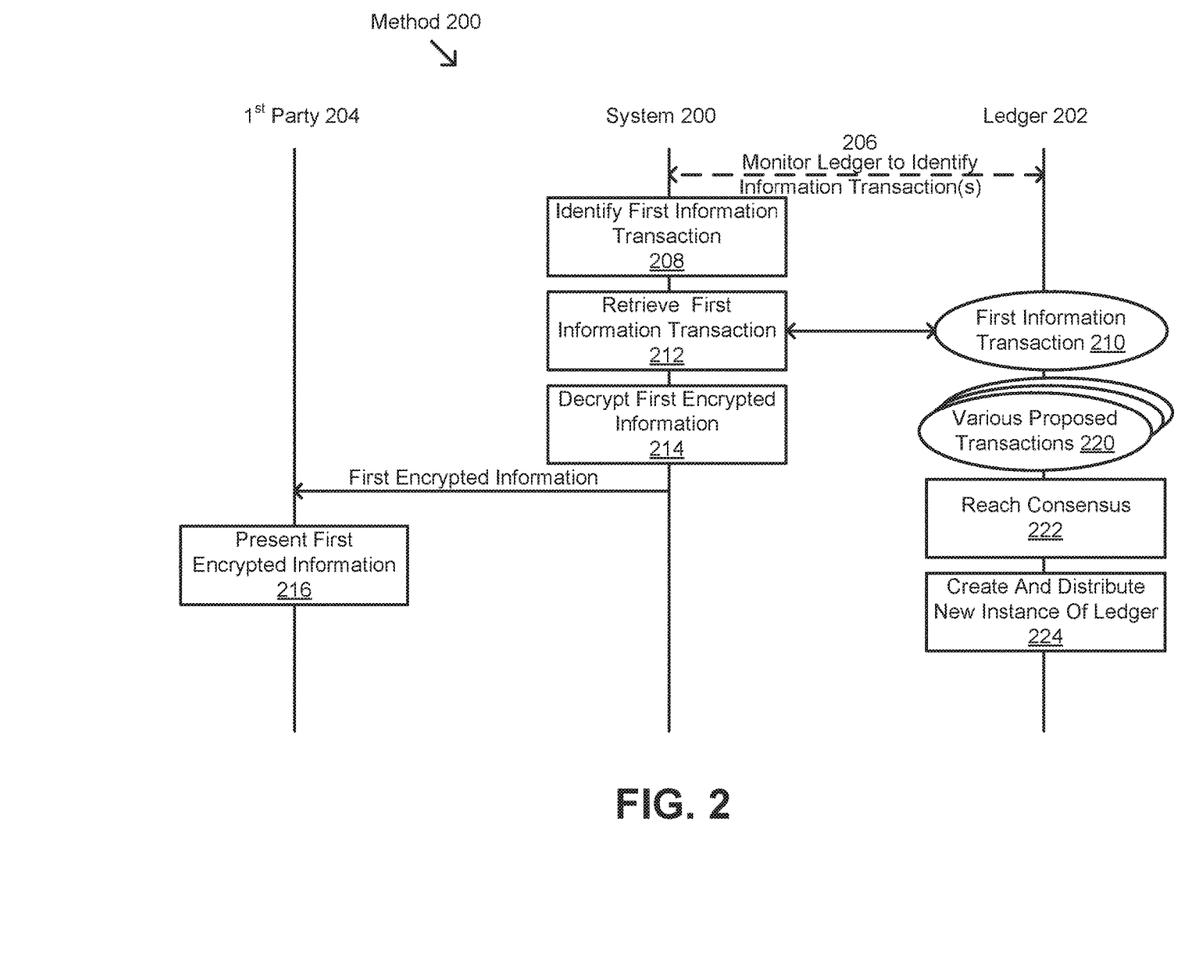
FIG. 2 illustrates a method for providing a cryptographic platform for exchanging information, in accordance with one or more implementations.

FIG. 2 illustrates a method 200 for providing a cryptographic platform for exchanging information, in accordance with one or more implementations. The method depicted in FIG. 2 is described in greater detail herein. The described operations may be accomplished using some or all of the system components described in detail herein and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

Method 200 in FIG. 2 depicts an illustrative data flow between one or more of ledger 202, a system server 201, a first client computing platform 204, and/or other platforms. System server 201 may be the same as or similar to one or more server(s) 110 (e.g., see FIG. 1). Ledger 202 may include computing platforms, server(s), and/or other component(s) of a system(s) associated with a distributed ledger that is the same as or similar to ledger 142 (e.g., see FIG. 1). First client computing platform 204 may be associated with the first party and may be the same as or similar to one or more client computing platform(s) 140 (e.g., see FIG. 1).

In some implementations, one or more operations of method 200 may be implemented in and/or by one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

In some implementations, at operation 206, system 201 may be configured to monitor ledger 202 to identify one or more information transactions. Operation 206 may be performed by one or more processors configured to execute an identification component that is the same as or similar to identification component 124, in accordance with one or more implementations. At operation 208, a first information transaction 210 may be identified by system 201. The first information transaction 210 may be held within ledger 202. The first information transaction 210 may include information intended for the first party. The first information transaction 210 may include one or more of: a first information transaction identifier associated with the first party; a first information payload; and/or other information. The first information payload may include first encrypted information. The first encrypted information may be encrypted with a first public key associated with the first party. Operation 208 may be performed by one or more processors configured to execute an identification component that is the same as or similar to identification component 124.

At operation 212, the first information transaction 210 may be retrieved from ledger 202. Operation 212 may be performed by one or more processors configured to execute a retrieval component that is the same as or similar to retrieval component 126, in accordance with one or more implementations. At operation 214, the first encrypted information may be decrypted with a first private key that corresponds to the first public key. Operation 212 may be performed by one or more processors configured to execute a decryption component that is the same as or similar to decryption component 128.

At operation 216, presentation of the first encrypted information to the first party may be facilitated through an electronic display of the first client computing platform 204. Operation 216 may be performed by one or more processors configured to execute a presentation component that is the same as or similar to presentation component 130.

In some implementations, at a given point in time, ledger 202 may include various proposed information transactions 220. At operation 222, ledger 202 may reach a consensus via a consensus protocol. At operation 224, a new instance of the distributed ledger may be created and distributed. In some implementations, operation 222 and operation 224 may be performed by one or more processors configured to execute a ledger component that is the same as or similar to ledger component 138. In some implementations, operation 222 and operation 224 may be performed by one or more server(s) associated with a public distributed ledger.

Figure 3:
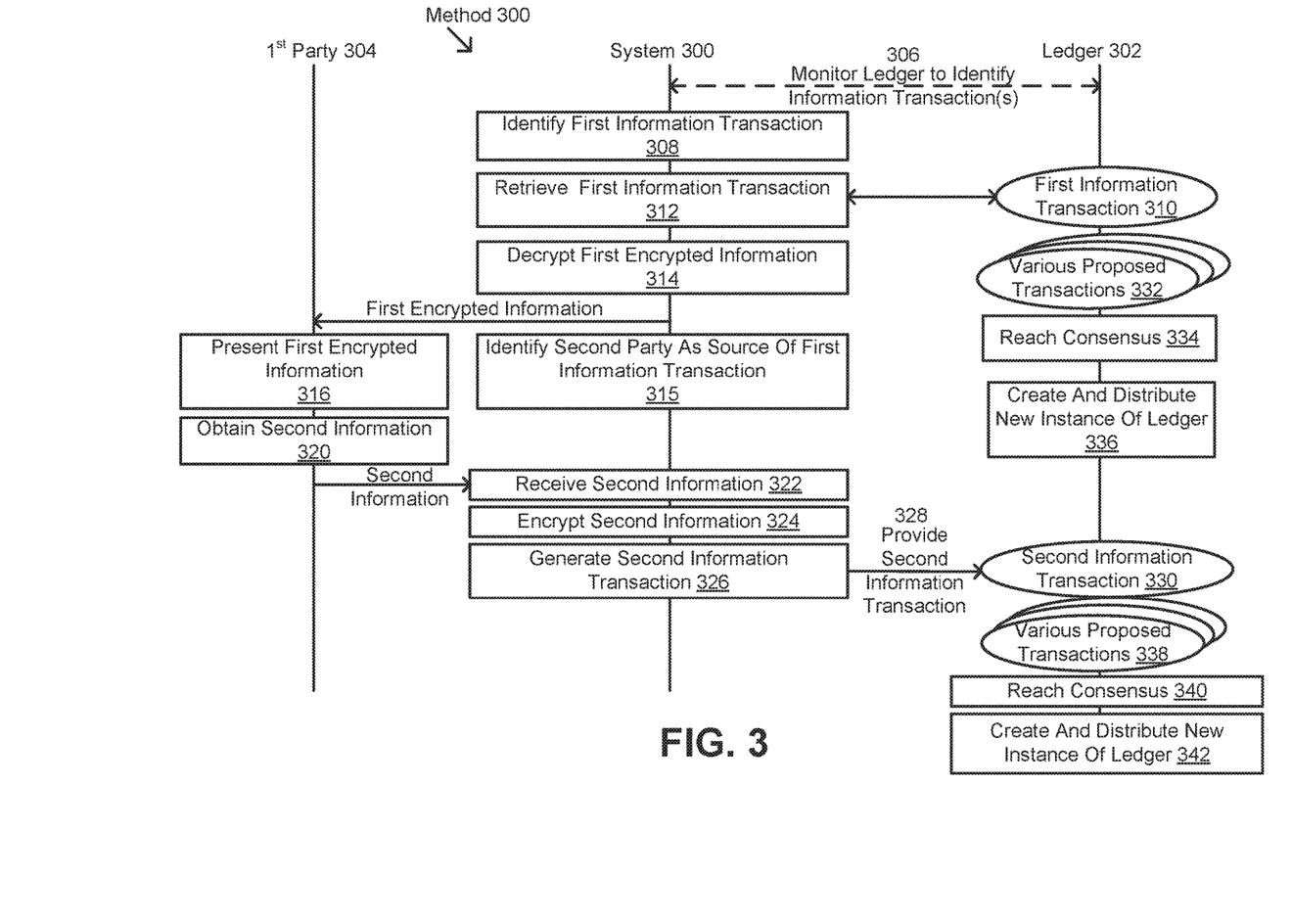
FIG. 3 illustrates a method for providing a cryptographic platform for exchanging information, in accordance with one or more implementations.

FIG. 3 illustrates a method 300 for providing a cryptographic platform for exchanging information, in accordance with one or more implementations. The method depicted in FIG. 3 is described in greater detail herein. The described operations may be accomplished using some or all of the system components described in detail herein and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

Method 300 in FIG. 3 depicts an illustrative data flow between one or more of a ledger 302, a system server 301, a first client computing platform 304, and/or other platforms. System server 301 may be the same as or similar to one or more server(s) 110 (e.g., see FIG. 1). Ledger 302 may include computing platforms, server(s), and/or other component(s) of a system(s) associated with a distributed ledger that is the same as or similar to ledger 142 (e.g., see FIG. 1). First client computing platform 304 may be associated with the first party and may be the same as or similar to one or more client computing platform(s) 140 (e.g., see FIG. 1).

In some implementations, one or more operations of method 300 may be implemented in and/or by one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

In some implementations, at operation 306, system 301 may be configured to monitor ledger 302 to identify one or more information transactions. Operation 306 may be performed by one or more processors configured to execute an identification component that is the same as or similar to identification component 124, in accordance with one or more implementations. At operation 308, a first information transaction 310 may be identified by system 301. The first information transaction 310 may be held within ledger 302. The first information transaction 310 may include information intended for the first party. The first information transaction 310 may include one or more of: a first information transaction identifier associated with the first party; a first information payload; and/or other information. The first information payload may include first encrypted information. The first encrypted information may be encrypted with a first public key associated with the first party. Operation 308 may be performed by one or more processors configured to execute an identification component that is the same as or similar to identification component 124.

At operation 312, the first information transaction 310 may be retrieved from ledger 302. Operation 312 may be performed by one or more processors configured to execute a retrieval component that is the same as or similar to retrieval component 126, in accordance with one or more implementations. At operation 314, the first encrypted information may be decrypted with a first private key that corresponds to the first public key. Operation 314 may be performed by one or more processors configured to execute a decryption component that is the same as or similar to decryption component 128.

At operation 315, a second party may be identified by system 304 as a source of the first information transaction. Operation 315 may be performed by one or more processors configured to execute an identification component that is the same as or similar to identification component 124. At operation 316, presentation of the first encrypted information to the first party may be facilitated through an electronic display of the first client computing platform 304. Operation 316 may be performed by one or more processors configured to execute a presentation component that is the same as or similar to presentation component 130. In some implementations, at operation 320, the first client computing platform 304 may obtain second information.

In some implementations, at operation 322, the second information may be received by system 301. The second information may include a communication for the second party. Operation 322 may be performed by one or more processors configured to execute an information component that is the same as or similar to information component 132.

At operation 324, the second information may be encrypted. The second information may be encrypted with a second public key associated with the second party. Operation 324 may be performed by one or more processors configured to execute an encryption component that is the same as or similar to encryption component 134.

In some implementations, at operation 326, a second information transaction 330 may be generated. The second information transaction may include one or more of: a second information transaction identifier associated with the second party; a second information payload; and/or other information. The second information payload may include encrypted second information. Operation 326 may be performed by one or more processors configured to execute a transaction component that is the same as or similar to transaction component 136. At operation 328, the second information transaction 330 may be provided to ledger 302 (e.g., the distributed ledger). The second information transaction 330 provided to ledger 302 may include the second information payload.

In some implementations, at a given point in time, ledger 302 may include various proposed information transactions 332. At operation 334, ledger 302 may reach a consensus via a consensus protocol. At operation 336, a new instance of the distributed ledger may be created and distributed. At operation 338, ledger 302 may include various proposed information transactions 332 including second information transaction 330. At operation 340, ledger 302 may reach a consensus via a consensus protocol. At operation 342, a new instance of the distributed ledger, including the addition of the second information transaction 330, may be created and distributed. In some implementations, operation 334 through operation 342 may be performed by one or more processors configured to execute a ledger component that is the same as or similar to ledger component 138. In some implementations, operation 334 through operation 342 may be performed by one or more server(s) associated with a public distributed ledger.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system for providing a cryptographic platform for exchanging information, the system comprising:
one or more physical computer processors associated with a first party and configured by machine-readable instructions to:
examine a blockchain to identify a first information transaction identifier stored within a block of the blockchain, the first information transaction identifier including a hash of a first information payload stored within the block of the blockchain and an unencrypted indication of the first party, and the first information payload including encrypted information addressed to the first party by a second party, wherein:
the hash of the first information payload enables auditing of the encrypted information without disclosure of the encrypted information; and
the encrypted information is encrypted with a first public key associated with the first party so that the encrypted information stored within the blockchain is not publicly accessible via the blockchain; and
in response to detecting the unencrypted indication of the first party, deliver the encrypted information to the first party, the delivering comprising:
retrieving the encrypted information from the blockchain; and
decrypting the encrypted information retrieved from the blockchain with a first private key that corresponds to the first public key.

2. The system of claim 1, wherein the one or more physical computer processors are further configured by machine-readable instructions to:
identify the second party as a source of the encrypted information;
receive second information from the first party, the second information including a communication for the second party;
encrypt a portion of the second information with a second public key associated with the second party to generate second encrypted information;
encrypt a portion of the second information with a third public key associated with a third party to generate third encrypted information;
generate a second information payload including the encrypted second information and the third encrypted information; and
generate a second information transaction identifier including a hash of the second information and third information and an unencrypted indication of the second party and the third party.

3. The system of claim 2, wherein the second information transaction identifier includes identification of the information intended for the second party held within the blockchain; and the one or more physical computer processors are further configured by machine readable instructions to provide the second information transaction identifier and the second information payload to the blockchain.

4. The system of claim 2, wherein the second information includes one or more of a message, an image, a document, or a video.

5. The system of claim 2, wherein the second information includes one or both of know your customer data or anti-money laundering data.

6. The system of claim 2, wherein the one or more physical computer processors are further configured by machine-readable instructions to:
provide the first public key associated with the first party to the second party.

7. The system of claim 1, wherein the one or more physical computer processors are further configured by machine-readable instructions to:
obtain a second public key associated with a second party.

8. The system of claim 2, wherein the encrypted information transferred to the first party includes a request for information and the encrypted second information includes information requested in the request for information.

9. The system of claim 1, wherein the first information transaction identifier associated with the first party includes the first public key.

10. The system of claim 1, wherein the encrypted information includes one or more of a message, an image, a document, or a video.

11. The system of claim 1, wherein the one or more physical computer processors are further configured by machine-readable instructions to:
identify one or more information payloads included in an audit; and
retrieve one or more of information describing the one or more information payloads determined to be included in the audit, information payloads included in the one or more information payloads determined to be included in the audit, or the one or more information payloads determined to be included in the audit.

12. The system of claim 1, wherein the one or more physical computer processors are further configured by machine-readable instructions to verify an integrity of the first information payload based on the hash of the first information payload.

13. A method for providing a cryptographic platform for exchanging information, the method being implemented on a computer system having one or more physical processors associated with a first party and configured by machine-readable instructions which, when executed, perform the method, the method comprising:
examining a blockchain to identify a first information transaction identifier stored within a block of the blockchain, the first information transaction identifier including a hash of a first information payload stored within the block of the blockchain and an unencrypted indication of the first party, and the first information payload including encrypted information addressed to the first party by a second party, wherein:
the hash of the first information payload enables auditing of the encrypted information without disclosure of the encrypted information; and
the encrypted information is encrypted with a first public key associated with the first party so that the encrypted information stored within the blockchain is not publicly accessible via the blockchain; and
in response to detecting the unencrypted indication of the first party, delivering the encrypted information to the first party, the delivering comprising:
retrieving the encrypted information from the blockchain; and
decrypting the encrypted information retrieved from the blockchain with a first private key that corresponds to the first public key.

14. The method of claim 13, further comprising:
identifying the second party as a source of the encrypted information;
receiving second information from the first party, the second information including a communication for the second party;
encrypting a portion of the second information with a second public key associated with the second party to generate second encrypted information;
encrypting a portion of the second information with a third public key associated with a third party to generate third encrypted information;
generating a second information payload including the encrypted second information and the third encrypted information; and
generating a second information transaction identifier including a hash of the second information and third information and an unencrypted indication of the second party and the third party.

15. The method of claim 14, wherein the second information transaction identifier includes identification of the information intended for the second party held within the blockchain; and the method further comprises:
providing the second information transaction identifier and the second information payload to the blockchain.

16. The method of claim 14, wherein the second information includes one or more of a message, an image, a document, or a video.

17. The method of claim 14, wherein the second information includes one or both of know your customer data or anti-money laundering data.

18. The method of claim 14, further comprising:
providing the first public key associated with the first party to the second party.

19. The method of claim 14, further comprising:
obtaining the second public key associated with the second party.

20. The method of claim 14, wherein the encrypted information transferred to the first party includes a request for information and the encrypted second information includes information requested in the request for information.

21. The method of claim 13, wherein the first information transaction identifier associated with the first party includes the first public key.

22. The method of claim 13, wherein the encrypted information includes one or more of a message, an image, a document, or a video.

23. The method of claim 13, further comprising:
identifying one or more information payloads included in an audit; and
retrieving one or more of information describing the one or more information payloads determined to be included in the audit, information payloads included in the one or more information payloads determined to be included in the audit, or the one or more information payloads determined to be included in the audit.

24. The method of claim 13, further comprising:
verifying an integrity of the first information payload based on the hash of the first information payload included in the first information transaction identifier.

* * * * *